United States Patent
Wu

(10) Patent No.: US 11,910,369 B2
(45) Date of Patent: Feb. 20, 2024

(54) UPLINK TRANSMISSION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 361 days.

(21) Appl. No.: 17/382,803

(22) Filed: Jul. 22, 2021

(65) Prior Publication Data
US 2021/0352672 A1 Nov. 11, 2021

Related U.S. Application Data

(63) Continuation of application No. PCT/CN2019/073793, filed on Jan. 29, 2019.

(51) Int. Cl.
H04W 72/0453 (2023.01)
H04W 16/14 (2009.01)

(52) U.S. Cl.
CPC ....... *H04W 72/0453* (2013.01); *H04W 16/14* (2013.01)

(58) Field of Classification Search
CPC .. H04W 72/0453; H04W 16/14; H04L 5/001; H04L 5/0092
See application file for complete search history.

(56) References Cited

U.S. PATENT DOCUMENTS

| | | | | |
|---|---|---|---|---|
| 2016/0294491 A1* | 10/2016 | Wu | ...................... | H04B 17/309 |
| 2019/0215110 A1* | 7/2019 | Yang | ..................... | H04W 76/27 |
| 2019/0215211 A1* | 7/2019 | Xue | ....................... | H04L 5/0051 |
| 2019/0223124 A1* | 7/2019 | Tang | ................... | H04W 56/001 |
| 2020/0052942 A1* | 2/2020 | Lin | ................... | H04W 36/0088 |

(Continued)

FOREIGN PATENT DOCUMENTS

| | | |
|---|---|---|
| CN | 107294686 A | 10/2017 |
| CN | 109150464 A | 1/2019 |
| WO | 2018175176 A1 | 9/2018 |

OTHER PUBLICATIONS

PCT/CN2019/073793 International Search Report, English translation; (dated Oct. 9, 2019) (Year: 2019).*

(Continued)

*Primary Examiner* — Benjamin H Elliott, IV
(74) *Attorney, Agent, or Firm* — Ladas & Parry LLP

(57) ABSTRACT

The present application provides a wireless communication method, a terminal device and a network device. The method includes: a terminal device determines a first interlace set on a first carrier according to a first frequency domain reference point, where the first interlace set includes at least one first interlace, the first interlace includes at least two frequency domain units, any two adjacent frequency domain units of the at least two frequency domain units are non-consecutive, and a frequency domain spacing between any two adjacent frequency domain units of the at least two frequency domain units is equal; and the terminal device performs uplink transmission through frequency-domain units included in the first interlace set.

14 Claims, 4 Drawing Sheets

200

A terminal device determines a first interlace set on a first carrier according to a first frequency domain reference point, where the first interlace set includes at least one first interlace, and the first interlace includes at least two frequency domain units, and any two adjacent frequency domain units of the at least two frequency domain units are non-consecutive, and a frequency domain spacing between any two adjacent frequency domain units of the at least two frequency domain units is equal ⟶ S210

The terminal device performs uplink transmission through frequency domain units included in the first interlace set ⟶ S220

(56) References Cited

U.S. PATENT DOCUMENTS

| | | | | |
|---|---|---|---|---|
| 2020/0067621 A1* | 2/2020 | Hu | ..................... | H04L 5/0048 |
| 2021/0136767 A1* | 5/2021 | Pitaval | ............... | H04W 74/004 |
| 2021/0337604 A1* | 10/2021 | Popovic | ............. | H04W 74/008 |
| 2021/0352672 A1* | 11/2021 | Wu | ..................... | H04W 16/14 |
| 2022/0104267 A1* | 3/2022 | Gao | ................. | H04W 72/1268 |
| 2022/0131731 A1* | 4/2022 | Yang | ............... | H04W 74/0816 |

OTHER PUBLICATIONS

"On Interlace Design for NR-U uplinks"; Ericsson; 3GPP TSG-RAN WG1 Meeting #94bis R1-1811305 Chengdu, China, Oct. 8-12, 2018 (Year: 2018).*

"Feature lead summary 2 for UL Signals and Channels"; Ericsson; 3GPP TSG RAN WG1 Meeting #94 R1-1811973 Chengdu, China, Oct. 8-12, 2018 (Year: 2018).*

International Search Report (ISR) dated Oct. 9, 2019 for Application No. PCT/CN2019/073793.

* cited by examiner

```
                  ┌─────────────────────────────────────────────────────────────┐
                  │ A terminal device determines a first interlace set on a     │
                  │ first carrier according to a first frequency domain         │
                  │ reference point, where the first interlace set includes at  │
                  │ least one first interlace, and the first interlace includes │── S210
                  │ at least two frequency domain units, and any two adjacent   │
                  │ frequency domain units of the at least two frequency domain │
                  │ units are non-consecutive, and a frequency domain spacing   │
                  │ between any two adjacent frequency domain units of the at   │
                  │ least two frequency domain units is equal                   │
                  └─────────────────────────────────────────────────────────────┘
                                               │
                  ┌─────────────────────────────────────────────────────────────┐
                  │ The terminal device performs uplink transmission through    │── S220
                  │ frequency domain units included in the first interlace set  │
                  └─────────────────────────────────────────────────────────────┘
```

FIG. 4

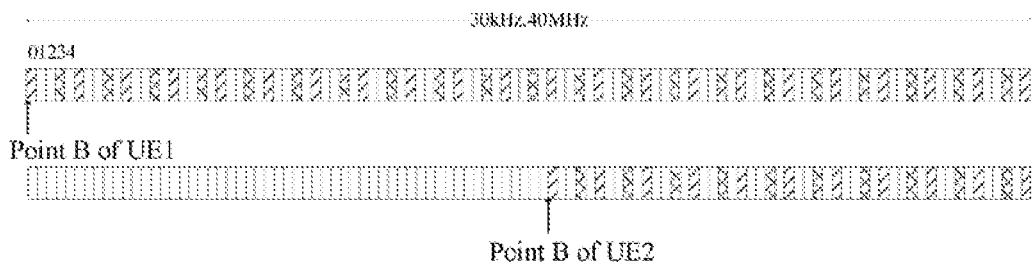

FIG. 5

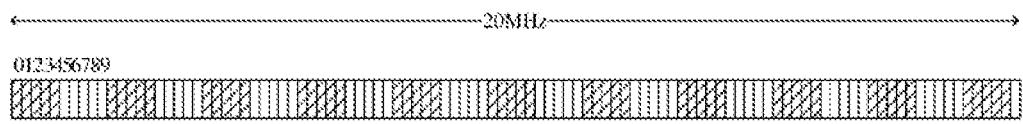

FIG. 6

```
                  ┌─────────────────────────────────────────────────────────────┐
                  │ A network device indicates a first frequency-domain         │
                  │ reference point to a terminal device, the first frequency-  │
                  │ domain reference point is used by the terminal device to    │
                  │ determine a first interlace set on a first carrier, where   │── S310
                  │ the first interlace set includes at least one first         │
                  │ interlace, and the first interlace includes at least two    │
                  │ frequency domain units, and any two adjacent frequency      │
                  │ domain units of the at least two frequency domain units are │
                  │ non-consecutive, and a frequency-domain spacing between any │
                  │ two adjacent frequency domain units of the at least two     │
                  │ frequency domain units is equal                             │
                  └─────────────────────────────────────────────────────────────┘
```

FIG. 7

UPLINK TRANSMISSION METHOD, TERMINAL DEVICE AND NETWORK DEVICE

CROSS-REFERENCE TO RELATED APPLICATION

This application is a continuation of International Application No. PCT/CN2019/073793, filed on Jan. 29, 2019, the disclosure of which is hereby incorporated by reference in its entirety.

TECHNICAL FIELD

Embodiments of the present application relate to the field of communications, and in particular, to a wireless communication method, a terminal device, and a network device.

BACKGROUND

When communicating on an unlicensed spectrum, some regulations require that a signal transmitted on a channel in the unlicensed spectrum need to occupy at least a certain percentage of the bandwidth of that channel. For example, for a Salt band, the signal occupies 80% of the channel bandwidth, and for a 60 GHz band, the signal occupies 70% of the channel bandwidth. In addition, in order to avoid that the power of the signal transmitted on the channel of the unlicensed spectrum is too high, which affects the transmission of other important signals on the channel, such as radar signals, some regulations stipulate the maximum power spectrum density of a communication device when using a channel of the unlicensed spectrum for signal transmission.

With the development of wireless communication technology, a licensed-assisted access long term evolution (LAA-LTE) system provides services to terminal devices based on a carrier aggregation structure, with carriers on licensed spectrum as primary carriers and carriers on unlicensed spectrum as secondary carriers. In uplink data channel transmission in the LAA-LTE system, in order to meet the requirement of signal occupying at least 80% of channel bandwidth and the maximize transmit power of uplink signal when a terminal device performs uplink data transmission, a basic unit for uplink resource allocation is an interlace structure, and the interlace structure includes non-consecutive physical resource blocks (PRBs), which may be, for example, an interlace structure as shown in FIG. 1. When the channel bandwidth is 20 MHz, the system includes 100 physical resource blocks (PRBs), and the 100 PRBs are divided into 10 interlaces, where each interlace includes 10 PRBs, and the frequency domain spacing between any two adjacent PRBs of the 10 PRBs is equal. For example, PRBs included in interlace #0 are PRB 0, 10, 20, 30, 40, 50, 60, 70, 80, 90.

In the LAA-LTE system, only limited system bandwidth is supported, while the system bandwidth supported by a new radio (NR) system is much larger than that of the LAA-LTE system, and the capacity of terminal devices is limited, so the concept of bandwidth part (BWP) is introduced, and a network device may configure one or more BWPs to a terminal device, and the bandwidth of each BWP is less than or equal to the maximum system bandwidth, where the BWP can include consecutive PRBs.

Therefore, how to determine a specific interlace structure for uplink transmission when an interlace structure is adopted for uplink transmission in an NR system is an urgent problem to be solved.

SUMMARY

Embodiments of the present application provide a wireless communication method, a terminal device, and a network device, which can determine an interlace set for uplink transmission according to a specific frequency domain reference point, and further, can perform uplink transmission on frequency domain resources included in the determined interlace set.

In a first aspect, a wireless communication method is provided, the method including: a terminal device determines a first interlace set on a first carrier according to a first frequency domain reference point, where the first interlace set includes at least one first interlace, the first interlace includes at least two frequency domain units, any two adjacent frequency domain units of the at least two frequency domain units are non-consecutive, and a frequency domain spacing between any two adjacent frequency domain units of the at least two frequency domain units is equal; and, the terminal device performs uplink transmission through frequency domain units included in the first interlace set.

In a second aspect, a wireless communication method is provided, including: a network device indicates, to a terminal device, a first frequency domain reference point, the first frequency domain reference point is used by the terminal device to determine a first interlace set on a first carrier, where the first interlace set includes at least one first interlace, the first interlace includes at least two frequency domain units, any two adjacent frequency domain units of the at least two frequency domain units are non-consecutive, and a frequency domain spacing between any two adjacent frequency domain units of the at least two frequency domain units is equal.

In a third aspect, a terminal device is provided for performing the method in the first aspect described above or any possible implementations of the first aspect. Specifically, the terminal device includes a unit for performing the method in the first aspect described above or any of possible implementations of the first aspect.

In a fourth aspect, a network device is provided for performing the method in the second aspect or any possible implementations of the second aspect described above. Specifically, the network device includes a unit for performing the method in the second aspect described above or any of possible implementations of the second aspect.

In a fifth aspect, a terminal device is provided, the terminal device including: a processor and a memory. The memory is configured to store a computer program, and the processor is configured to call and run the computer program stored in the memory to perform the method in the first aspect described above or various implementations thereof.

In a sixth aspect, a network device is provided, the network device including: a processor and a memory. The memory is configured to store a computer program, and the processor is configured to call and run the computer program stored in the memory to perform the method in the second aspect described above or various implementations thereof.

In a seventh aspect, a chip is provided for implementing the method in any one of the first to second aspects described above or various implementations thereof.

Specifically, the chip includes: a processor, configured to call a computer program from a memory and run the computer program to cause a device on which the chip is installed to perform the method in any one of the first to second aspects described above or various implementations thereof.

In an eighth aspect, a computer readable storage medium is provided, for storing a computer program, the computer program causing a computer to perform the method in any one of the first to second aspects described above or various implementations thereof.

In a ninth aspect, a computer program product is provided, including computer program instructions, the computer program instructions causing a computer to perform the method in any one of the first to second aspects described above or various implementations thereof.

In a tenth aspect, a computer program is provided, and the computer program, when run on a computer, causes the computer to perform the method in any one of the first to second aspects described above or various implementations thereof.

Based on the above technical solutions, the terminal device can determine the first interlace set on the first carrier according to a particular frequency domain reference point, and further, can perform uplink transmission on the frequency domain resources included in the determined interlace set.

BRIEF DESCRIPTION OF DRAWINGS

FIG. 4 is a schematic diagram of a wireless communication method provided in an embodiment of the present application.

FIG. 5 is a schematic diagram of different UEs corresponding to different locations of a second frequency domain reference point.

FIG. 6 is a schematic diagram of determined consecutive interlaces.

FIG. 7 is a schematic diagram of a wireless communication method provided in an embodiment of the present application.

DESCRIPTION OF EMBODIMENTS

The technical solutions in the embodiments of the present application will be described below in conjunction with the accompanying drawings in the embodiments of the present application, and it is clear that the described embodiments are part of the embodiments of the present application, rather than all of the embodiments. Based on the embodiments in the present application, all other embodiments obtained by a person of ordinary skill in the art without creative efforts fall within the scope of protection of the present application.

The technical solutions of the embodiments of the present application can be applied to various communication systems, such as: a global system of mobile communication (GSM) system, a code division multiple access (COMA) system, a wideband code division multiple access (WCDMA) system, a wideband code division multiple access (WCDMA) system, general packet radio service (GPRS), a long term evolution (LTE) system, an LTE frequency division duplex (FDD) system, an LTE time division duplex (TDD) system, an advanced long term evolution (LTE-A) system, a new radio (NR) system, an evolution system of NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, wireless local area networks, WLAN (WLAN), wireless fidelity (WiFi), a next generation communication system, or other communication systems.

Generally speaking, conventional communication systems support a limited number of connections, and is easy to implement. However, as communication technology evolves, mobile communication systems will support not only conventional communication, but also, for example, device to device (D2D) communication, machine to machine (M2M) communication, machine type communication (M2M), vehicle to vehicle (V2V) communication, etc., to which embodiments of the present application can also be applied.

Figure 2:
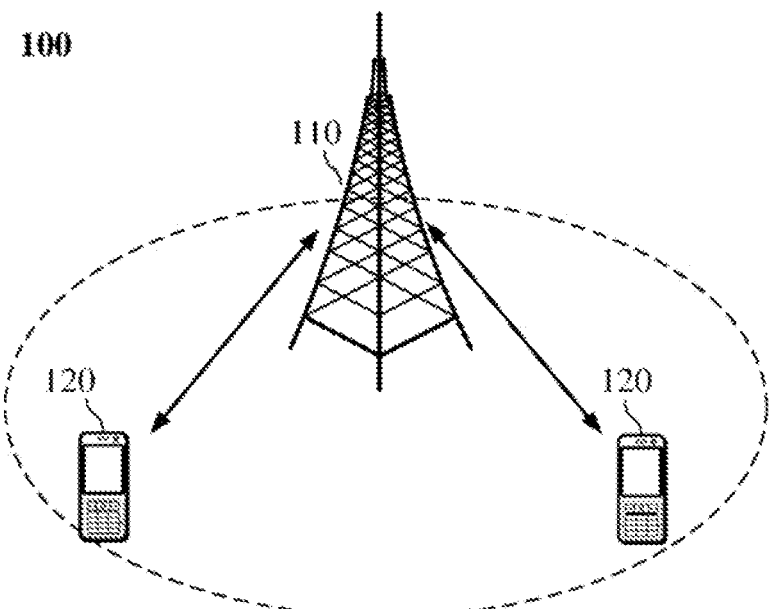
FIG. 2 is a schematic diagram of an application scenario provided in an embodiment of the present application.

Illustratively, a communication system 100 applied in an embodiment of the present application is as shown in FIG. 2. The communication system 100 may include a network device 110, and the network device 110 may be a device that communicates with a terminal device 120 (or referred to as a communication terminal, or a terminal). The network device 110 may provide communication coverage for a specific geographic area and may communicate with terminal devices located within that coverage area. In an embodiment, the network device 110 may be a base station (BTS) in a GSM system or a CDMA system, or may be a base station (NodeB, NB) in a WCDMA system, or may also be an evolutionary base station (eNB or eNodeB) in an LTE system, or a radio controller in a cloud radio access network (CRAN), or the network device may be a mobile switching center, a relay, an access point, an in-vehicle device, a wearable device, a hub, a switch, a bridge, a router, a network side device in a 5G network, or a network device in a future evolved public land mobile network (PLMN).

The communication system 100 also includes at least one terminal device 120 located within the coverage area of the network device 110. The "terminal device" used herein includes, but is not limited to, being connected by a wired circuit, for example, being connected through a public switched telephone network (PSTN), a digital subscriber line (DSL), a digital cable, or a direct cable; and/or another data connection/network; and/or via a wireless interface, for example, a cellular network, a wireless local area network (WLAN), a digital television network such as a DVB-H network, a satellite network, or an AM-FM radio transmitter; and/or an apparatus configured to receive/transmit communication signals, of another terminal device; and/or an Internet of things (IoT) device. A terminal device configured to communicate via a wireless interface may be referred to as a "wireless communication terminal", a "wireless terminal", or a "mobile terminal". Examples of the mobile terminal include, but are not limited to, a satellite or cellular phone; a personal communications system (PCS) terminal that may combine a cellular radio phone with capabilities of data processing, fax, and data communication; a personal digital assistant (PDA) that may include a radio phone, a pager, Internet/Intranet accessing, a Web browser, a notebook, a calendar, and/or a global positioning system (GPS) receiver; or a common laptop and/or palmtop receiver or other electronic apparatus including a radio telephone transceiver. The terminal device may refer to an access terminal, a user equipment (UE), a user unit, a user station, a mobile station, a mobile console, a remote station, a remote terminal, a mobile device, a user terminal, a terminal, a wireless communication device, a user agent, or a user apparatus. The access terminal may be a cellular phone, a cordless phone, a session initiation protocol (SIP) phone, a wireless local loop (WLL) station, a personal digital assistant (PDA), a handheld device with wireless communication capabilities, a computing device or other processing device connected to a wireless modem, an in-vehicle device, a wearable device, a terminal device in a 5G network, or a terminal device in a future evolved PLMN, etc.

In an embodiment, device to device (D2D) communication may be performed between the terminal devices 120.

In an embodiment, a 5G system or a 5G network may also be referred to as a new radio (NR) system or an NR network.

FIG. 2 illustratively shows one network device and two terminal devices. In an embodiment, the communication system 100 may include multiple network devices, and within the coverage area of each network device, another number of terminal devices may be included, which is not limited in the embodiments of the present application.

In an embodiment, the communication system 100 may also include other network entities such as network controllers, mobile management entities, which is not limited in the embodiments of the present application.

It should be understood that the devices with communication functions in the network/system in the embodiments of the present application may be referred to as communication devices. Taking the communication system 100 illustrated in FIG. 2 as an example, the communication devices may include the network device 110 and the terminal devices 120 with communication functions, and the network device 110 and the terminal devices 120 may be the devices specifically described above and will not be described here again. The communication devices may also include other devices in the communication system 100, such as network controllers, mobile management entities, and other network entities, which is not limited in the embodiments of the present application.

It should be understood that the terms "system" and "network" are often used interchangeably herein. The term "and/or" herein is simply a description of the association of related objects, indicating that three relationships can exist, e.g., A and/or B can mean: A exists alone, both A and B exist, and B exists alone. In addition, the character "/" used herein generally indicates that the associated objects before and after are in an "or" relationship.

The method of the embodiments of the present application may be applied to communications in an unlicensed spectrum, and may also be applied in other communication scenarios, such as a scenario of communicating in a licensed spectrum.

An unlicensed spectrum is a spectrum allocated by countries and regions which is available for radio device communication. The spectrum can be considered as a shared spectrum, that is, communication devices in different communication systems may use the spectrum as long as they meet regulatory requirements set by the countries or regions on the spectrum, without applying to a government for an exclusive spectrum license. In order to enable various wireless communication systems using the unlicensed spectrum for wireless communication to coexist friendly on the spectrum, communication devices can follow a principle of listen before talk (LBT) when communicating on the unlicensed spectrum, that is, communication devices need to perform channel listening (or channel detection) before transmitting a signal on a channel of the unlicensed spectrum. Only when a channel listening result is that the channel is idle, the communication device may perform signal transmission. If the listening result of the communication device on the channel of the unlicensed spectrum is that the channel is busy, the communication device cannot perform signal transmission.

In order to avoid sub-band interference to signals transmitted on the channel of the unlicensed spectrum channel, and to improve the detection accuracy of the communication device when detecting the channel on the unlicensed spectrum, a signal transmitted on the channel of the unlicensed spectrum channel needs to occupy at least a certain percentage of the bandwidth of that channel. For example, for a 5 GHz band, the signal occupies 80% of the channel bandwidth, and for a 60 GHz band, the signal occupies 70% of the channel bandwidth.

For another example, in order to avoid that the power of the signal transmitted on the channel of the unlicensed spectrum is too high and affects the transmission of other important signals on the channel, such as radar signals, regulations stipulate the maximum power and the maximum power spectral density of the communication equipment when using the channel of the unlicensed spectrum for signal transmission.

In the NR system, the frequency band is divided into two main parts: FR1 and FR2, where the bandwidth of FR1 may be 5 MHz, 10 MHz, 15 MHz, 20 MHz, 25 MHz, 30 MHz, 40 MHz, 50 MHz, 60 MHz, 80 MHz and 100 MHz, etc., and the bandwidth of FR2 may be 50 MHz, 100 MHz, 200 MHz and 400 MHz, etc. FR1 includes low frequency bands and FR2 includes high frequency or millimeter wave bands.

In the NR system, the network device supports single carrier with large bandwidth. For a same bandwidth, the number of PRBs included can be determined according to different subcarrier spacings (SCSs), processing complexity, minimum reserved band, etc. Thus, for FR1 and FR2 bands, the maximum number of PRBs that can be transmitted for different bandwidths and different SCSs are shown in Table 1 and Table 2, respectively.

TABLE 1

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 70 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|---|
| 15 | 25 | 52 | 79 | 106 | 133 | 160 | 216 | 270 | N.A | N.A | N.A | N.A | N.A |
| 30 | 11 | 24 | 38 | 51 | 65 | 78 | 106 | 133 | 162 | 189 | 217 | 245 | 273 |
| 60 | N.A | 11 | 18 | 24 | 31 | 38 | 51 | 65 | 79 | 93 | 107 | 121 | 135 |

TABLE 2

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

When the unlicensed band includes a band of 5 GHz and/or 6 GHz, the unlicensed band may be considered to belong to FR1. In an embodiment, the carrier bandwidth is 20 MHz or an integer multiple of 20 MHz on the unlicensed band. As an example, assuming that the number of PRBs included in the NR-U system with a certain bandwidth and a certain subcarrier spacing is the same as the number of PRBs included in the NR system with the same bandwidth and the same subcarrier spacing, according to Table 1, when the subcarrier spacing is 15 kHz and the system bandwidth is 20 M and 40 M, the number of PRBs included is 106, 216 PRBs, respectively; when the subcarrier spacing is 30 kHz, and the system bandwidth is 20 M, 40 M and 80 M, the number of PRBs included is 51, 106, 217 PRBs respectively; when the subcarrier spacing is 60 kHz, and the system bandwidth is 20 M, 40 M and 80 M, the number of PRBs included is 24, 51, 107 PRBs, respectively.

It should be noted that, in an LTE system with a carrier bandwidth of 20 MHz, the number of PRBs included is 100; in an NR system, the number of PRBs included is 106 in a case of 15 kHz when the carrier bandwidth is 20 MHz because guard bands reserved on both sides of the carrier can be smaller due to better RF filters.

In an NR-based access to unlicensed spectrum (NR-U) system, the design of interlace structures for different subcarrier spacings in different bandwidth scenarios needs to be considered. In an embodiment, the interlace structure can be defined as follows: when the carrier bandwidth is 20 MHz, for a subcarrier spacing of 15 kHz, 10 interlaces (i.e., M=10) are included and each interlace includes 10 or 11 PRBs; for a subcarrier spacing of 30 kHz, 5 interlaces (i.e., M=5) are included and each interlace includes 10 or 11 PRBs, etc.

Figure 3:
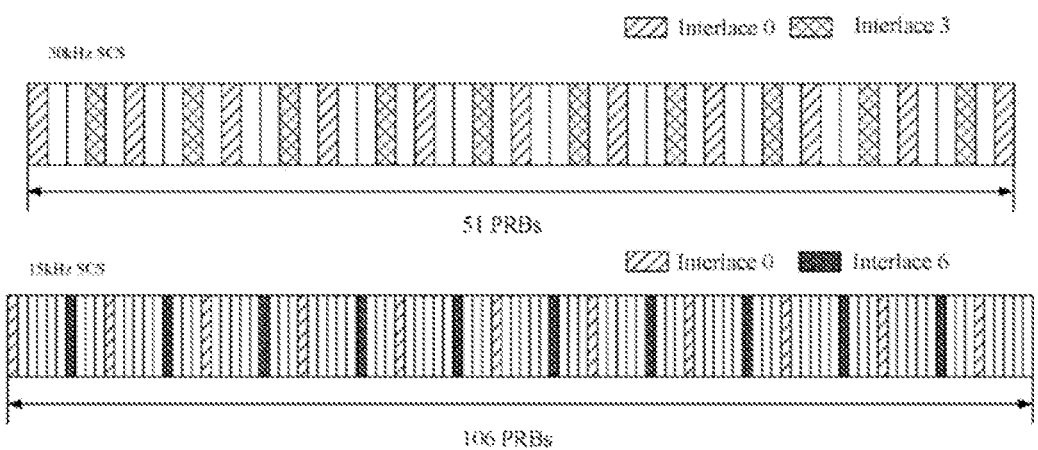
FIG. 3 is a comparative diagram of PRBs included in interlace structures of different SCSs.

FIG. 3 shows two possible interlace structures by taking the number of PRBs included in the 20 MHz bandwidth being 106 and 51 for cases of 15 kHz and 30 kHz, respectively, as an example. Specifically, FIG. 3 shows PRB locations for interlace number 0 and interlace number 6 with an SCS of 15 kHz, where interlace 0 includes 11 PRBs and interlace 6 includes 10 PRBs, and PRB locations for interlace number 0 and interlace number 3 with an SCS of 30 kHz, where interlace 0 includes 11 PRBs and interlace 3 includes 10 PRBs. It should be understood that the number of PRBs included in the NR-U system for a certain bandwidth may be the same as that in the NR system, or there may be a new number of PRBs with a similar interlace structure design.

It should be understood that when the carrier bandwidth is greater than 20 MHz, 10 interlaces (i.e., M=10) are still included for the subcarrier spacing of 15 kHz, and 5 interlaces (i.e., M=5) are still included for the subcarrier spacing of 30 kHz. However, the number of PRBs included for each interlace varies depending on the carrier bandwidth.

In the NR system, a terminal device performs uplink transmission, e.g., physical uplink shared channel (PUSCH) or physical uplink control channel (PUCCH) transmission, and needs to determine a band width part (BWP) on which the transmission is performed, and a specific procedure is as follows.

First, the terminal device determines a location of a carrier, and specifically, a network device configures parameters including, but not limited to, the following:
 a frequency domain reference point (absoluteFrequencyPointA), for example, subcarrier 0 of common resource block (common RB) 0, or Point A;
 one or more carriers (for example, in a carrier aggregation (Carrier Aggregation, CA) scenario), including, for example, a first carrier;
 a first subcarrier spacing (SCS) of the first carrier, i.e., the SCS corresponding to the first carrier, which may take a value of 15 or 30 kHz when the first carrier belongs to FR1 and 60 or 120 kHz when the first carrier belongs to FR2;
 a start position (offsetToCarrier) of the first carrier, i.e., a distance between a first available subcarrier on the first carrier and the frequency domain reference point in a unit of PRB determined according to the first SCS, taking a value ranging from 0 to 275*8-1;
 a bandwidth size (carrierBandwidth) of the first carrier in a unit of PRB determined according to the first SCS, taking a value ranging from 1 to 275.

The terminal device may then determine a frequency domain location and a bandwidth size of the first carrier, according to the above parameters.

Further, the terminal device may determine a location and a size of the BWP.

Specifically, the network device may configure one or more BWPs on the first carrier for the terminal device, it is assumed that a first BWP is included, and then the network device may configure parameters such as a cyclic prefix (CP) type of the first BWP, a second SCS of the first BWP, a frequency domain location and a bandwidth size of the first BWP, which, for example, may be indicated by a resource indicator value (RIV), assuming that the bandwidth size of the first carrier is 275, starting from the start position of the first carrier, taking the PRB determined according the second SCS as the unit, a range of the value is 0 to 37949.

That is, in the NR system, the configuration of the BWP may be any start position within a carrier and any length not greater than the bandwidth of the carrier, and a BWP includes a plurality of consecutive PRBs. However, when the basic unit for uplink resource allocation is an interlace structure, it is clear that the above-mentioned method of determining the BWP or, in other words, the method of resource allocation is no longer applicable to the NR-U system, and therefore, there is a need for a technical solution that can determine the interlace structure for uplink transmission.

FIG. 4 is a schematic flowchart of a wireless communication method 200 according to an embodiment of the present application. The method 200 includes at least some of the following contents.

In S210, a terminal device determines a first interlace set on a first carrier according to a first frequency domain reference point, where the first interlace set includes at least one first interlace, the first interlace includes at least two frequency domain units, any two adjacent frequency domain units of the at least two frequency domain units are non-consecutive, and a frequency domain spacing between any two adjacent frequency domain units of the at least two frequency domain units is equal.

In S220, the terminal device performs uplink transmission through frequency domain units comprised in the first interlace set.

In an embodiment, of the present application, the first interlace set can be understood as a first bandwidth part BWP on the first carrier configured by a network device for the terminal device, in other words, the frequency domain units of the first interlace set form the first BWP on the first carrier configured by the network device.

In an embodiment, of the present application, the first interlace set can also be understood as an uplink resource on the first carrier allocated by a network device for the terminal device, in other words, the frequency domain units of the first interlace set form the uplink resource on the first carrier configured by the network device.

In an embodiment, when the first interlace set is a BWP configured by a network device to the terminal device, the terminal device may transmit through all or part of the frequency domain units in the first interlace set. That is, on the BWP, the terminal device may determine, through an allocated interlace index, the frequency domain units for transmission.

In an embodiment, when a first interlace set is an uplink resource allocated by a network device to the terminal device, the terminal device may transmit through all the frequency domain units in the first interlace set; in an embodiment, if the terminal device is allowed to perform uplink transmission in a condition that LBT is successful on part of the bandwidth, the terminal device may perform uplink transmission through all or part of the frequency domain units included in the first interlace set on the part of the bandwidth where the LBT is successful.

Thus, the manner of determining a first interlace set in an embodiment of the present application may also be considered as a manner of determining of a BWP or a method for allocating an uplink resource.

It should be understood that in an embodiment of the present application, a frequency domain unit may be one or more PRBs or one or more subcarriers (for example, a frequency domain unit includes six subcarriers, i.e., half of a PRB), which is not limited by the present application. When a frequency domain unit includes at least two subcarriers, the at least two subcarriers may be consecutive or non-consecutive in the frequency domain (for example, a frequency domain spacing between any two adjacent subcarriers of the at least two subcarriers is equal and any two adjacent subcarriers are non-consecutive), which is not limited by the present application.

In an embodiment, the present application, the first carrier corresponds to a first SCS, the first BWP on the first carrier corresponds to a second SCS, and the first SCS and the second SCS are the same or different.

In an embodiment, the first frequency domain reference point may be indicated to the terminal device by a network device.

In an embodiment, the network device may indicate the first frequency domain reference point by a high level signaling or a physical layer signaling, where the high level signaling includes, but is not limited to, a radio resource control (RRC) signaling or a media access control (MAC) signaling, and the physical layer signaling includes downlink control information (DCI).

In an embodiment, of the present application, the first frequency domain reference point may also be preset, for example, specified by a standard, or agreed upon by a network device and the terminal device.

In some embodiments, the first frequency domain reference point is a common reference point, corresponding to subcarrier 0 of common RB 0 as previously described, noted as Point A.

In some other embodiments, the first frequency domain reference point may also be a start position of the first carrier, noted as Point B, or other reference positions, which is not limited by the embodiments of the present application. In an embodiment, the start position of the first carrier may be a position of a first subcarrier of a first available PRB in the first carrier at a certain subcarrier spacing.

Hereinafter, the method of determining a first interlace set according to the embodiments of the present application is described with reference to embodiment 1-embodiment 2.

In the embodiment 1, the terminal device may determine a second frequency domain reference point and/or a third frequency domain reference point according to the first frequency domain reference point, and further determine the first interlace set according to the second frequency domain reference point and/or the third frequency domain reference point.

In an embodiment, the second frequency domain reference point is a first subcarrier included in a first frequency domain unit of the first carrier; and/or, the third frequency domain reference point is a last subcarrier included in a last frequency domain unit of the first carrier.

It should be understood that, in an embodiment of the present application, the first frequency domain reference point may also be a second frequency domain reference point or a third frequency domain reference point, and in this case the terminal device may need not to determine the second frequency domain reference point or the third frequency domain reference point, but directly determine the first interlace set according to the second frequency domain reference point or the third frequency domain reference point, and for the specific implementation, please refer to the relevant description below.

In an embodiment, the first frequency domain reference point and the second frequency domain reference point have a third frequency domain offset therebetween. For example, the third frequency domain offset is the offsetToCarrier as described above.

The terminal device may determine the second frequency domain reference point according to the first frequency domain reference point and the third frequency domain offset.

In an embodiment, the second frequency domain reference point may be a start position of the first carrier, and in this case the second frequency domain reference point may be determined according to the offsetToCarrier as described above.

In some embodiments, the first frequency domain reference point is a common reference point corresponding to subcarrier 0 of common RB 0 as described above, denoted as Point A. The second frequency domain reference point is a start position of the first carrier, denoted as Point B.

In an embodiment, the second frequency domain reference point may be used to determine a start position of the first BWP, that is, a start position of the first interlace.

In an embodiment, the third frequency domain offset is preset, or is indicated by a network device to the terminal device, or is determined according to a first subcarrier spacing SCS or a second SCS, where the first SCS corresponds to the first carrier and the second SCS corresponds to the first BWP.

In an embodiment, different SCSs correspond to different second frequency domain reference points.

By setting different start positions for different SCSs, different radio frequency sidebands may be considered to ensure reservation of guard bands.

In an embodiment, different SCSs correspond to a same second frequency domain reference point.

That is, different SCSs correspond to the same or different third frequency domain offsets.

By setting the same start position for different SCSs, the implementation complexity of the terminal device is simplified.

In some embodiments, the second frequency domain reference point determined by different terminal devices may be different, as shown in FIG. 5, thus implementing flexible allocation of recourses of different terminal devices.

In an embodiment, the first frequency domain reference point and the third frequency domain reference point have a fourth frequency domain offset therebetween.

Then, the terminal device may determine the third frequency domain reference point according to the first frequency domain reference point and the fourth frequency domain offset.

In an embodiment, the third frequency domain reference point may be an end position of the first carrier. In an embodiment, an end position of the first carrier may be a position of a last subcarrier of a last available PRB in the first carrier at a certain subcarrier spacing.

In an embodiment, the third frequency domain reference point may be used to determine an end position of the first BWP, that is, the end position of the first interlace set, and in this way, the terminal device may consider the end position of the first BWP when determining the first BWP, thereby implementing flexible allocations of resources of the terminal device.

In an embodiment, the fourth frequency domain offset is preset, or is indicated to the terminal device by a network device, or is determined according to a first subcarrier spacing SCS or a second. SCS, where the first SCS corresponds to the first carrier and the second SCS corresponds to the first BWP.

By configuring a start position and/or an end position of the first BWP for the terminal device, the allocation of resources on an unlicensed spectrum and the multiplexing of resources between different terminal devices can be flexibly implemented.

In an embodiment, different SCSs correspond to different third frequency domain reference points.

In an embodiment, different SCSs correspond to a same third frequency domain reference point.

Correspondingly, different SCSs correspond to the same or different fourth frequency domain offsets.

In some embodiments, the third frequency domain reference point determined by different terminal devices can be different, thus implementing flexible allocation of recourses of different terminal devices.

In some embodiments, the terminal device determines the first interlace set according to the second frequency domain reference point and/or the third frequency domain reference point, and first indication information.

In an embodiment, the first indication information can be a signaling, or multiple signalings. For example, the first indication information may be a downlink control information (DCI) signaling, or an RRC signaling, or a combination of an RRC signaling and a DCI signaling, etc.

The following will illustrate specific implementations with reference to specific embodiments, which are embodiments 1-1 to embodiments 1-3.

In embodiment 1-1, the first interlace set includes at least one first interlace having a consecutive index, the first indication information includes a first resource indicator value (RIV), the first RIV is used to determine a start value and a length of the index of the first interlace included in the first interlace set, where the start value is determined by taking the second frequency domain reference point as a start position, and the length is used to determine a number of the first interlace included in the first interlace set.

In other words, the at least one first interlace included in the first interlace set is a consecutive interlace, and the first RIV may indicate the consecutive interlace by means of the start value and the length of the index of the interlace.

It should be understood that the start value may be determined by taking the second frequency domain reference point as a start position, that is, the start value is a number of interlaces offset relative to the second frequency domain reference point. Assuming that the start value is 0, then the start value is a first interlace taking the Point B as a start position, or, if the start value is 2, then the start value is a third interlace taking the Point B as a start position.

In some embodiments, the start value and the length of the index of the first interlace are S and L, respectively, and the first RIV may be determined according to the following equations: if $(L-1) \le $ floor $(M/2)$, $RIV = M \times (L-1) + S$;

$$\text{otherwise, } RIV = M \times (M-L+1) + (M-1-S);$$

where floor denotes down rounding, $1 \le L \le M-S$, $0 \le S \le M-1$, and M denotes a total number of the first interlace.

In an embodiment, when the first carrier includes 10 interlaces (i.e., M=10), a value of the RIV ranges from 0 to 54, that is, a number of states included by the RIV is $M^*(M+1)/2 = 55$.

For example, when the first carrier includes 5 interlaces (i.e., M=5), a value of the RIV ranges from 0 to 14, that is, a number of states included by the RIV is $M^*(M+1)/2=15$.

For example, when the first carrier includes 10 interlaces (i.e., M=10), if a value of the RIV is 40, then L=5 and S=0, i.e., indexes of interlaces included in the first BWP are interlace 0 to interlace 4, as shown in FIG. 6.

In an embodiment, a total number of the first interlace, M, can be determined according to the second SCS. For example, if the second SCS is 15 kHz, the total number of the first interlace M=10, and if the second SCS is 30 kHz, the total number of the first interlace M=5.

In embodiment 1-1, the first interlace set may also include at least two first interlaces having non-consecutive indexes, the first indication information includes a second RIV, and the second RIV is used to determine at least two first interlaces having non-consecutive indexes included in the first interlace set.

Indicating interlaces having non-consecutive indexes through the first indication information can improve the flexibility in multiplexing terminal devices. For example, UE1 may be configured with interlace indexes 0 to 4 and 9, and UE2 may be configured with interlace indexes 5 to 9. A network device may indicate UE1 and UE2 to transmit a PUCCH through interlace 9, and indicate UE1 and UE2 to transmit their respective PUSCH through interlaces 0 to 4 and interlaces 5 to 8, respectively, which can improve the flexibility in multiplexing terminal devices.

In some embodiments, the terminal device may determine interlaces having non-consecutive indexes according to the state of the RIV.

For example, when the first carrier includes 10 interlaces, a number of valid states of the RIV is 55, then the RIV requires 6 bits to carry, and indication information of 6 bits may be used to indicate 0 to 63, then the states 55 to 63 are redundant states, and in this case, these redundant states may be used to indicate indexes of non-consecutive interlaces. For example, a corresponding relationship between the redundant states and the start values and the offsets of the indexes of the first interlaces may be established, for example, as shown in Table 3.

TABLE 3

| RIV-M(M + 1)/2 | S | P |
|---|---|---|
| 0 | 0 | {0, 5} |
| 1 | 0 | {0, 1, 5, 6} |
| 2 | 1 | {0, 5} |
| 3 | 1 | {0, 1, 2, 3, 5, 6, 7, 8} |
| 4 | 2 | {0, 5} |
| 5 | 2 | {0, 1, 2, 5, 6, 7} |
| 6 | 3 | {0, 5} |
| 7 | 4 | {0, 5} | where S is a start value of indexes of non-consecutive interlaces, P is an offset relative to the start value, RIV-M (M+1)/2 is a total number of redundant states of the RIV minus a total number of valid states of the RIV, and if the RIV is 56, i.e., RIV-M(M+1)/2 is 1, then it can be determined that the interlaces having non-consecutive indexes include interlace #0, interlace #1, interlace #5, and interlace #6.

In some embodiments, a new information field may be added to an existing message (e.g., a resource indication information field) or signaling for carrying the index of the first interlace included in the first interlace, for example, the information field may be used to carry non-consecutive interlace indexes, e.g., an S and a P value in Table 3, or the information field may be used to carry the start value and the length of consecutive interlace indexes, e.g., an S and an L value.

In embodiment 1-2, the first indication information includes a first frequency domain offset, the first frequency domain offset is used to determine a frequency domain unit X included in a first interlace with an index of 0, and the frequency domain unit X included in the first interlace with the index of 0 satisfies: Mod (X, M)=the first frequency domain offset, where Mod denotes a modulo operation, X denotes an index of a frequency domain unit included in the first interlace with the index of 0 when the second frequency domain reference point is taken as a start position, and a value of X ranges from 0 to N−1, M denotes a total number of the first interlace, N denotes a total number of frequency domain units included between the second frequency domain reference point and the third frequency domain reference point, and M and N are positive integers.

In this case, in an embodiment, the first indication information further includes indication information of the index of the first interlace included in the first interlace set, and for a specific indicating manner, reference may be made to relevant description in embodiment 1-1, which will not be repeated here.

Further, the terminal device may determine the frequency domain unit included in the first interlace set according to the frequency domain unit included in the first interlace with an index of 0, in combination with the index of the first interlace determined according to the first indication information.

In an embodiment of the present application, the first interlace with an index of 0 may be considered as a basic interlace, or, a reference interlace, and the basic interlace may be used to determine other interlaces. For example, this basic interlace is interlace #0, and according to a frequency domain unit included in the interlace #0, the frequency domain units included in other interlaces other than interlace #0 can be determined.

It is noted that the first frequency domain offset is only for the basic interlace, for example, it may be an offset only for the basic interlace, that is, the terminal device may determine a frequency domain unit included in a basic interlace according to the first frequency domain offset. Further, with reference to the index of the first interlace included in the first interlace set, frequency domain units included in the interlaces with other indexes may be determined.

For example, if the index of the basic interlace is interlace #0 and Mod (X, M)=first frequency domain offset is satisfied, then:

a frequency domain unit $Z_1$ included in interlace #1 satisfies Mod ($Z_1$, M)=the first frequency domain offset+1;

a frequency domain unit $Z_2$ included in interlace #2 satisfies Mod ($Z_2$, M)=the first frequency domain offset+2;

a frequency domain unit $Z_{M-1}$ included in interlace #M−1 satisfies Mod ($Z_{M-1}$, M)=the first frequency domain offset+ M−1.

For example, assuming that the second frequency domain reference point and the third frequency domain reference point have 51 frequency domain units therebetween (i.e., N=51) and the 51 frequency domain units correspond to 5 interlaces (i.e., M=5) and the first frequency domain offset is 1 frequency domain unit, then the frequency unit X included in the basic interlace satisfies: Mod (X, 5)=1, where the value of X ranges from 0 to 50. Then the indexes of frequency domain units included in the basic interlace are 1, 6, 11, 16, 21, 26, 31, 36, 41, 46.

Further, if the first indication information indicates that the start value and the length of the indexes of the first interlaces are 0 and 2, respectively, then the indexes of frequency domain units included in the first interlace set can be determined as 1, 2, 6, 7, 11, 12, 16, 17, 21, 22, 26, 27, 31, 32, 36, 37, 41, 42, 46, 47.

In an embodiment, the first frequency domain offset is one or more frequency domain units, or the first frequency domain offset is part of a frequency domain unit, for example, the first frequency domain offset is half of a frequency domain unit, which is not limited in the embodiments of the present application.

In an embodiment, the first frequency domain offset takes a value of 0.

In an embodiment, the first frequency domain offset is determined according to a second SCS (or, a unit of the first frequency domain offset is determined according to a second SCS), where the second SCS is a subcarrier spacing corresponding to the first BWP.

In an embodiment, the first frequency domain offset is determined according to a first SCS (or, a unit of the first frequency domain offset is determined according to a first SCS), where the first SCS is a subcarrier spacing corresponding to the first carrier.

In an embodiment, the first frequency domain offset is an offset corresponding to the first SCS.

In an embodiment, offsets for different subcarrier spacings are different. For example, when a first SCS is 30 kHz, the first frequency domain offset is 2, and when the first SCS is 15 kHz, the first frequency domain offset is 6.

In an embodiment, offsets for different subcarrier spacings are the same. For example, when the first SCS is 30 kHz, the first frequency domain offset is 0, and when the first SCS is 15 kHz, the first frequency domain offset is 0.

In an embodiment, offsets for different subcarrier spacings take the same value but have different units. For example, the first frequency domain offset for a 15 kHz SCS is one frequency domain unit having a subcarrier spacing of 15 kHz, the first frequency domain offset for a 30 kHz SCS is one frequency domain unit having a subcarrier spacing of 30 kHz, and the first frequency domain offset for a 60 kHz SCS is one frequency domain unit having a subcarrier spacing of 60 kHz.

In embodiment 1-3, the first indication information includes a second frequency domain offset, the second frequency domain offset is used to determine a frequency domain unit Y included in the first interlace set, and the frequency domain unit Y included in the first interlace set satisfies:

Mod($Y,M$)=the second frequency domain offset, where Mod denotes a modulo operation, Y denotes an index of a frequency domain unit included in the first interlace set when the second frequency domain reference point is taken as a start position, a value of Y ranges from 0 to N−1, M denotes a number of the first interlace, N denotes a total number of frequency domain units included between the second frequency domain reference point and the third frequency domain reference point, and M and N are positive integers.

The difference from embodiment 1-2 is that, the terminal device can directly take the second frequency domain reference point as a start position, and in combination with the second frequency domain offset, determine a frequency domain unit that can be used for uplink transmission, and need not to determine the first interlace set, or it can also be considered as that the frequency domain units determined in embodiment 1-3 constitute frequency domain units included in the first interlace set, or it can also be considered as that the frequency domain units determined in embodiment 1-3 constitute the first BWP.

It should be noted that, the second frequency domain offset is for the first interlace set, which may, in an embodiment, include a set of offsets. For example, when the first interlace set includes interlace #a, interlace #b and interlace #c, the second frequency domain offset can include multiple offsets A, B and C, where A correspond to interlace #a, B correspond to interlace #b, and C correspond to interlace #c, and the terminal device can determine frequency domain units included in interlace #a according to A, frequency domain units included in interlace #b according to B, and frequency domain units included in interlace #c according to C, and these frequency domain units constitute the frequency domain units included in the first interlace set.

For example, assuming that the second frequency domain reference point and the third frequency domain reference point have 51 frequency domain units therebetween (i.e., N=51) and the 51 frequency domain units correspond to 5 interlaces (i.e., M=5) and the second frequency domain offset is {2, 3} frequency domain units, then a frequency unit Y included in the first interlace set satisfies: Mod (Y, 5)={2, 3}, where a value of Y ranges from 0 to 50. Then the indexes of the frequency domain units included in the first interlace set are 2, 3, 7, 8, 12, 13, 17, 18, 22, 23, 27, 28, 32, 33, 37, 38, 42, 43, 47, 48.

Therefore, the embodiment 1-3 may also be considered as a manner of resource allocation, and it should be understood that, in the manner of resource allocation, different interlaces may include the same or different numbers of frequency domain units.

Embodiment 2

In embodiment 2, the terminal device determines the first interlace set according to the first frequency domain reference point and second indication information.

It should be understood that, the second indication information is similar to the first indication information, and for the specific implementation, reference may be made to relevant description in the above-mentioned embodiments.

In an embodiment, the second indication information may be one signaling, or multiple signalings. For example, the first indication information may be a DCI signaling, or an RRC signaling, or a combination of an RRC signaling and a DCI signaling, etc.

The difference from the embodiment 1 is that, in the embodiment 2, the terminal device can determine the first interlace set directly according to the first frequency domain reference point, and need not to determine the second frequency domain reference point or the third frequency domain reference point.

In embodiment 2-1, as an optional embodiment of embodiment 2, the second indication information includes at least one of a fifth frequency domain offset and a sixth frequency domain offset, where the fifth frequency domain offset is used to determine a frequency domain unit P included in a first interlace with an index of 0, and the frequency domain unit P included in the first interlace with the index of 0 satisfies:

Mod ($P$−the sixth frequency domain offset,$M$)=the fifth frequency domain offset, where Mod denotes a modulo operation, P denotes an index of a frequency domain unit included in the first interlace with the index of 0 when the first frequency domain reference point is taken as a start position, a value of P ranges from the sixth frequency domain offset to the sixth frequency domain offset+N−1, M denotes a total number of the first interlace, N denotes a total number of frequency domain units included between the second frequency domain reference point and the third frequency domain reference point, and M and N are positive integers.

In this case, in an embodiment, the second indication information further includes indication information of the index of the first interlace included in the first interlace set, and for a specific indicating manner, reference may be made to relevant description in embodiment 1, which will not be repeated here.

Further, the terminal device may determine the frequency domain units included in the first interlace set according to the frequency domain units included in the first interlace with the index of 0, in combination with the index of the first interlace determined according to the second indication information.

It should be understood, in embodiment 2, the first interlace having the index of 0 may also be considered as a basic interlace, and for the specific implementation, reference may be made to relevant description about the basic interlace in the above, which will not be repeated here.

It should be noted that the fifth frequency domain offset is only for the basic interlace, for example, it may be an offset only for the basic interlace, that is, the terminal device may determine the frequency domain units included in the basic interlace according to the fifth frequency domain offset. Further, with reference to the index of the first interlace included in the first interlace set, the frequency domain units included in the interlaces with other indexes may be determined.

In some embodiments, if the second indication information can do not indicate the sixth frequency domain offset, the sixth frequency domain offset can be preset, or be agreed by the network device and the terminal device; or if the second indication information can do not indicate the fifth frequency domain offset, the fifth frequency domain offset can be preset, or be agreed by the network device and the terminal device.

In some embodiments, the sixth frequency domain offset may be an offset of the second frequency domain reference point relative to the first frequency domain reference point, which is the third frequency domain offset.

For example, assuming that the first frequency domain reference point and the third frequency domain reference point have 55 frequency domain units therebetween, the sixth frequency domain offset is 4 frequency domain units, then the indexes of valid frequency domain units are 4-52 (i.e. N×51), and the 51 frequency domain units correspond to 5 interlaces (i.e. M=5), the fifth frequency domain offset is 1 frequency domain unit, then a frequency domain unit X included in a basic interlace satisfies: Mod (P−4, 5)=1, where a value of P ranges from 0-54. Then the indexes of frequency domain units included in the basic interlace are 5, 10, 15, 20, 25, 30, 35, 40, 45, 50.

Further, if the first indication information indicates that a start value and a length of an index of a first interlace are 0 and 2 respectively, then an index of a frequency domain unit included in the first interlace set can be determined as 5, 6, 10, 11, 15, 16, 20, 21, 25, 26, 30, 31, 35, 36, 40, 41, 45, 46, 50.

In embodiment 2-2, as an optional embodiment of embodiment 2, the second indication information includes at least one of a seventh frequency domain offset and an eighth frequency domain offset, the seventh frequency domain offset is used to determine a frequency domain unit Q included in the first interlace set, and the frequency domain unit Q included in the first interlace set satisfies:

Mod($Q$−the eighth frequency domain offset,$M$)=the seventh frequency domain offset, where Mod denotes a modulo operation, Q denotes an index of a frequency domain unit included in the first interlace set when the first frequency domain reference point is taken as a start position, a value of Q ranges from the eighth frequency domain offset to the eighth frequency domain offset+N−1, M denotes a number of the first interlace, N denotes a total number of frequency domain units included between the second frequency domain reference point and the third frequency domain reference point, and M and N are positive integers.

The difference from embodiment 2-1 is that, the terminal device can directly take the first frequency domain reference point as a start position, and in combination with the seventh frequency domain offset and the eighth frequency domain offset, determine the frequency domain units that can be used for uplink transmission, and need not to determine the first interlace set, or it may also be considered as that the frequency domain units determined in embodiment 2-2 constitute the frequency domain units included in the first interlace set, or it may also be considered as that the frequency domain units determined in embodiment 2-2 constitute the first BWP.

In some embodiments, if the second indication information can do not indicate the seventh frequency domain offset, the seventh frequency domain offset may be preset, or be agreed by the network device and the terminal device; or if the second indication information can do not indicate the eighth frequency domain offset, the eighth frequency domain offset may be preset, or be agreed by the network device and the terminal device.

It should be noted that, the seventh frequency domain offset is only for the first interlace set, which may, in an embodiment, include a set of offsets. For example, when the first interlace set includes interlace #a, interlace #b and interlace #c, the seventh frequency domain offset may include multiple offsets A, B and C, where A correspond to interlace #a, B correspond to interlace #b, and C correspond to interlace #b, and the terminal device may determine frequency domain units included in interlace #a according to A, frequency domain units included in interlace #b according to B, and frequency domain units included in interlace #c according to C, and these frequency domain units constitute the frequency domain units included in the first interlace set.

For example, assuming that the first frequency domain reference point and the third frequency domain reference point have 51 frequency domain units therebetween, the eighth frequency domain offset is 0, then indexes of valid frequency domain units are 0-50 (i.e. N=51), and the 51 frequency domain units correspond to 5 interlaces (i.e. M=5), the seventh frequency domain offset is {2, 3} frequency domain unit, then a frequency domain unit Q included in the first interlace set satisfies: Mod (Q, 5)={2, 3}, where a value of Q ranges from 0 to 50. Then the indexes of the frequency domain units included in the first interlace set are 2, 3, 7, 8, 12, 13, 17, 18, 22, 23, 27, 28, 32, 33, 37, 38, 42, 43, 47, 48.

The above described the wireless communication method according to the embodiments of the present application in detail from the perspective of a terminal device with reference to FIG. 4-FIG. 6. The following will describe a wireless communication method according to another embodiment of the present application in detail from the perspective of a network device with reference to FIG. 7. It should be understood that, the description from the perspective of a network device and the description from the perspective of a terminal device correspond to each other, and reference can be made to the above for similar description, which will not be repeated here.

Figure 1:
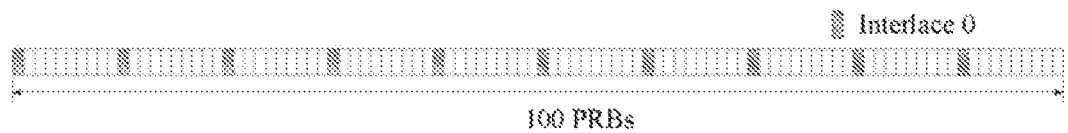
FIG. 1 is a schematic diagram of an interlace structure.

FIG. 7 shows a schematic flow chart of a communication method 300 according to another embodiment of the present application, and the method 300 may be performed by a network device in a communication system shown in FIG. 1.

S310, a network device indicates a first frequency domain reference point to a terminal device, the first frequency domain reference point is used by the terminal device to determine a first interlace set on a first carrier, where the first interlace set includes at least one first interlace, the first interlace includes at least two frequency domain units, any two adjacent frequency domain units of the at least two frequency domain units are non-consecutive, and a frequency domain spacing between any two adjacent frequency domain units of the at least two frequency domain units is equal.

In an embodiment, the network device performs uplink transmission through frequency domain units included in the first interlace set. In an embodiment, the network device performs uplink transmission through all or part of frequency domain units included in the first interlace set.

In an embodiment, the first frequency domain reference point is further used by the terminal device to determine a second frequency domain reference point and/or a third frequency domain reference point.

In an embodiment, the method further includes: the network device transmits first indication information to the terminal device, where the first indication information is used by the terminal device to determine the first interlace set.

In an embodiment, the first interlace set includes at least one first interlace having a consecutive index, the first indication information includes a first resource indicator value RIV, the first RIV is used to determine a start value and a length of the index of the first interlace included in the first interlace set, where the start value is determined by taking the second frequency domain reference point as a start position, and the length is used to determine a number of the first interlace included in the first interlace set.

In an embodiment, the first RIV has a following relationship with the start value S and the length L of the index of the first interlace:

if $(L-1) \leq \text{floor}(M/2), \text{RIV} = M \times (L-1) + S;$ otherwise, $\text{RIV} = M \times (M-L+1) + (M-1-S);$ where floor denotes down rounding, $1 \leq L \leq M-S$, $0 \leq S \leq M-1$, and M denotes a total number of the first interlace.

In an embodiment, the first interlace set includes at least two first interlaces having non-consecutive indexes, and the first indication information includes a second RIV, where the second RIV is used to determine the at least two first interlaces having non-consecutive indexes included in the first interlace set.

In an embodiment, the first indication information includes a first frequency domain offset, the first frequency domain offset is used to determine a frequency domain unit X included in a first interlace with an index of 0, and the frequency domain unit X included in the first interlace with the index of 0 satisfies:

$\text{Mod}(X, M) =$ the first frequency domain offset;

where Mod denotes a modulo operation, X denotes an index of a frequency domain unit included in the first interlace with the index of 0 when the second frequency domain reference point is taken as a start position, and a value of X ranges from 0 to N−1, M denotes a total number of the first interlace, N denotes a total number of frequency domain units included between the second frequency domain reference point and the third frequency domain reference point, and M and N are positive integers.

In an embodiment, the first indication information further includes indication information of the index of the first interlace included in the first interlace set.

In an embodiment, the first indication information includes a second frequency domain offset, the second frequency domain offset is used to determine a frequency domain unit Y included in the first interlace set, and the frequency domain unit Y included in the first interlace set satisfies:

$\text{Mod}(Y, M) =$ the second frequency domain offset;

where Mod denotes a modulo operation, Y denotes an index of a frequency domain unit included in the first interlace set when the second frequency domain reference point is taken as a start position, a value of Y ranges from 0 to N−1, M denotes a number of the first interlace, N denotes a total number of frequency domain units included between the second frequency domain reference point and the third frequency domain reference point, and M and N are positive integers.

In an embodiment, the first frequency domain reference point and the second frequency domain reference point have a third frequency domain offset therebetween, where the third frequency domain offset is preset, or is indicated by a network device to the terminal device.

In an embodiment, the first frequency domain reference point and the second frequency domain reference point have a third frequency domain offset therebetween, where the third frequency domain offset is determined according to a first subcarrier spacing SCS, and the first SCS is an SCS corresponding to the first interlace set; or, the third frequency domain offset is determined according to a second SCS, and the second SCS is an SCS corresponding to the first carrier.

In an embodiment, the first frequency domain reference point and the third frequency domain reference point have a fourth frequency domain offset therebetween, where the fourth frequency domain offset is preset, or is indicated by a network device to the terminal device.

In an embodiment, the first frequency domain reference point and the third frequency domain reference point have a fourth frequency domain offset therebetween, where the fourth frequency domain offset is determined according to a first subcarrier spacing SCS, and the first SCS is an SCS corresponding to the first interlace set; or, the fourth frequency domain offset is determined according to a second SCS, and the second SCS is an SCS corresponding to the first carrier.

In an embodiment, the method further includes: the network device indicates second indication information to the terminal device, where the second indication information is used by the terminal device to determine the first interlace set.

In an embodiment, the second indication information includes at least one of a fifth frequency domain offset and a sixth frequency domain offset, where the fifth frequency domain offset is used to determine a frequency domain unit P included in a first interlace with an index of 0, and the frequency domain unit P included in the first interlace with the index of 0 satisfies:

$\text{Mod}(P-\text{the sixth frequency domain offset}, M) =$ the fifth frequency domain offset, where Mod denotes a modulo operation, P denotes an index of a frequency domain unit included in the first interlace with the index of 0 when the first frequency domain reference point is taken as a start position, a value of P ranges from the sixth frequency domain offset to the sixth frequency domain offset+N−1, M denotes a total number of the first interlace, N denotes a total number of frequency domain units included between the second frequency domain reference point and the third frequency domain reference point, and M and N are positive integers.

In an embodiment, the second indication information further includes indication information of the index of the first interlace included in the first interlace set.

In an embodiment, the second indication information includes at least one of a seventh frequency domain offset and an eighth frequency domain offset, the seventh frequency domain offset is used to determine a frequency domain unit Q included in the first interlace set, and the frequency domain unit Q included in the first interlace set satisfies:

$\text{Mod}(Q-\text{the eighth frequency domain offset}, M) =$ the seventh frequency domain offset, where Mod denotes a modulo operation, Q denotes an index of a frequency domain unit included in the first interlace set when the first frequency domain reference point is taken as a start position, a value of Q ranges from the eighth frequency domain offset to the eighth frequency domain offset+N−1, M denotes a number of the first interlace, N denotes a total number of frequency domain units included between the second frequency domain reference point and the third frequency domain reference point, and M and N are positive integers.

In an embodiment, the second frequency domain reference point is a first subcarrier included in a first frequency domain unit of the first carrier; and/or, the third frequency domain reference point is a last subcarrier included in a last frequency domain unit of the first carrier.

In an embodiment, the first frequency domain reference point is a common reference point for carrier configuration.

In an embodiment, a total number of the first interlace is determined according to an SCS corresponding to the first interlace, where the total number of the first interlace M=10 when the SCS corresponding to the first interlace is 15 kHz; or the total number of the first interlace M=5 when the SCS corresponding to the first interlace is 30 kHz.

In an embodiment, the first interlace set is a first bandwidth part BWP on the first carrier configured by a network device for the terminal device.

In an embodiment, the first interlace set is an uplink resource on the first carrier allocated by a network device for the terminal device.

The method embodiments of the present application are described above in detail with reference to FIG. 4-FIG. 7. Device embodiments of the present application will be described in detail in the following with reference to FIG. 8-FIG. 12. It should be understood that the device embodiments and method embodiments correspond to each other, reference may be made to the method embodiments for similar description.

Figure 8:
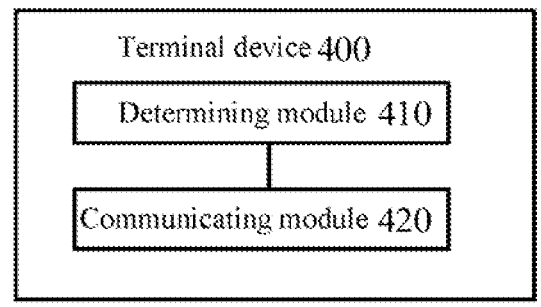
FIG. 8 is a schematic block diagram of a terminal device provided in an embodiment of the present application.

FIG. 8 shows a schematic block diagram of a terminal device 400 according to an embodiment of the present application. As shown in FIG. 8, the terminal device 400 includes:

a determining module 410, configured to determine a first interlace set on a first carrier according to a first frequency domain reference point, where the first interlace set includes at least one first interlace, the first interlace includes at least two frequency domain units, any two adjacent frequency domain units of the at least two frequency domain units are non-consecutive, and a frequency domain spacing between any two adjacent frequency domain units of the at least two frequency domain units is equal; and a communicating module 420, configured to perform uplink transmission through frequency domain units included in the first interlace set.

In an embodiment, the determining module is specifically configured to: determine a second frequency domain reference point and/or a third frequency domain reference point according to the first frequency domain reference point; and determine the first interlace set according to the second frequency domain reference point and/or the third frequency domain reference point.

In an embodiment, the determining module is further configured to: determine, by the terminal device, the first interlace set according to the second frequency domain reference point and/or the third frequency domain reference point, and first indication information.

In an embodiment, the first interlace set includes at least one first interlace having a consecutive index, the first indication information includes a first resource indicator value RIV, the first RIV is used to determine a start value and a length of the index of the first interlace included in the first interlace set, where the start value is determined by taking the second frequency domain reference point as a start position, and the length is used to determine a number of the first interlace included in the first interlace set.

In an embodiment, the first RIV has a following relationship with the start value S and the length L of the index of the first interlace:

if $(L-1) \le \text{floor}(M/2), \text{RIV}=M \times (L-1)+S;$ otherwise, $\text{RIV}=M \times (M-L+1)+(M-1-S);$ where floor denotes down rounding, $1 \le L \le M-S$, $0 \le S \le M-1$, and M denotes a total number of the first interlace.

In an embodiment, the first interlace set includes at least two first interlaces having non-consecutive indexes, the first indication information includes a second RIV, and the second RIV is used to determine the at least two first interlaces having non-consecutive indexes included in the first interlace set.

In an embodiment, the first indication information includes a first frequency domain offset, the first frequency domain offset is used to determine a frequency domain unit X included in a first interlace with an index of 0, and the frequency domain unit X included in the first interlace with the index of 0 satisfies:

$\text{Mod}(X,M)=$the first frequency domain offset, where Mod denotes a modulo operation, X denotes an index of a frequency domain unit included in the first interlace with the index of 0 when the second frequency domain reference point is taken as a start position, and a value of X ranges from 0 to N−1, M denotes a total number of the first interlace, N denotes a total number of frequency domain units included between the second frequency domain reference point and the third frequency domain reference point, and M and N are positive integers.

In an embodiment, the first indication information further includes indication information of the index of the first interlace included in the first interlace set.

In an embodiment, the first indication information includes a second frequency domain offset, the second frequency domain offset is used to determine a frequency domain unit Y included in the first interlace set, and the frequency domain unit Y included in the first interlace set satisfies:

$\text{Mod}(Y,M)=$the second frequency domain offset, where Mod denotes a modulo operation, Y denotes an index of a frequency domain unit included in the first interlace set when the second frequency domain reference point is taken as a start position, a value of Y ranges from 0 to N−1, M denotes a number of the first interlace, N denotes a total number of frequency domain units included between the second frequency domain reference point and the third frequency domain reference point, and M and N are positive integers.

In an embodiment, the first frequency domain reference point and the second frequency domain reference point have a third frequency domain offset therebetween, where the third frequency domain offset is preset, or is indicated by a network device to the terminal device.

In an embodiment, the first frequency domain reference point and the second frequency domain reference point have a third frequency domain offset therebetween, where the third frequency domain offset is determined according to a first subcarrier spacing SCS, and the first SCS is an SCS corresponding to the first interlace set; or, the third frequency domain offset is determined according to a second SCS, and the second SCS is an SCS corresponding to the first carrier.

In an embodiment, the first frequency domain reference point and the third frequency domain reference point have a fourth frequency domain offset therebetween, where the fourth frequency domain offset is preset, or is indicated by a network device to the terminal device.

In an embodiment, the first frequency domain reference point and the third frequency domain reference point have a fourth frequency domain offset therebetween, where the fourth frequency domain offset is determined according to a first subcarrier spacing SCS, and the first SCS is an SCS corresponding to the first interlace set; or, the fourth frequency domain offset is determined according to a second SCS, and the second SCS is an SCS corresponding to the first carrier.

In an embodiment, the determining module is further configured to: determine the first interlace set according to the first frequency domain reference point and second indication information.

In an embodiment, the second indication information includes at least one of a fifth frequency domain offset and a sixth frequency domain offset, the fifth frequency domain offset is used to determine a frequency domain unit P included in a first interlace with an index of 0, and the frequency domain unit P included in the first interlace with the index of 0 satisfies:

Mod(P–the sixth frequency domain offset,M)=the fifth frequency domain offset, where Mod denotes a modulo operation, P denotes an index of a frequency domain unit included in the first interlace with the index of 0 when the first frequency domain reference point is taken as a start position, a value of P ranges from the sixth frequency domain offset to the sixth frequency domain offset+N−1, M denotes a total number of the first interlace, N denotes a total number of frequency domain units included between the second frequency domain reference point and the third frequency domain reference point, and M and N are positive integers.

In an embodiment, the second indication information further includes indication information of the index of the first interlace included in the first interlace set.

In an embodiment, the second indication information includes at least one of a seventh frequency domain offset and an eighth frequency domain offset, the seventh frequency domain offset is used to determine a frequency domain unit Q included in the first interlace set, and the frequency domain unit Q included in the first interlace set satisfies:

Mod(Q–the eighth frequency domain offset,M)=the seventh frequency domain offset, where Mod denotes a modulo operation, Q denotes an index of a frequency domain unit included in the first interlace set when the first frequency domain reference point is taken as a start position, a value of Q ranges from the eighth frequency domain offset to the eighth frequency domain offset+N−1, M denotes a number of the first interlace, N denotes a total number of frequency domain units included between the second frequency domain reference point and the third frequency domain reference point, and M and N are positive integers.

In an embodiment, the second frequency domain reference point is a first subcarrier included in a first frequency domain unit of the first carrier; and/or, the third frequency domain reference point is a last subcarrier included in a last frequency domain unit of the first carrier.

In an embodiment, the first frequency domain reference point is a common reference point for carrier configuration.

In an embodiment, a total number of the first interlace is determined according to an SCS corresponding to the first interlace, where the total number of the first interlace M=10 when the SCS corresponding to the first interlace is 15 kHz; or the total number of the first interlace M=5 when the SCS corresponding to the first interlace is 30 kHz.

In an embodiment, the first interlace set is a first bandwidth part BWP on the first carrier configured by a network device for the terminal device.

In an embodiment, the first interlace set is an uplink resource on the first carrier allocated by a network device for the terminal device.

It should be understood that the terminal device 400 according to the embodiments of the present application can correspond to the terminal device in the method embodiments of the present application, and the above-mentioned and other operations and/or functions of each unit in the terminal device 400 are for implementing the corresponding process of the terminal device in the method 200 shown in FIG. 2, which will not be repeated here for brevity.

Figure 9:
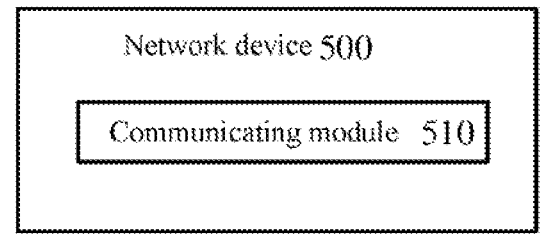
FIG. 9 is a schematic block diagram of a network device provided in an embodiment of the present application.

FIG. 9 shows a schematic block diagram of a network device according to an embodiment of the present application. The network device 500 in FIG. 9 includes:

a communicating module 510, configured to indicate a first frequency domain reference point to a terminal device, where the first frequency domain reference point is used by the terminal device to determine a first interlace set on a first carrier, where the first interlace set includes at least one first interlace, the first interlace includes at least two frequency domain units, any two adjacent frequency domain units of the at least two frequency domain units are non-consecutive, and a frequency domain spacing between any two adjacent frequency domain units of the at least two frequency domain units is equal.

In an embodiment, the first frequency domain reference point is further used by the terminal device to determine a second frequency domain reference point and/or a third frequency domain reference point.

In an embodiment, the communicating module 510 is further configured to: transmit first indication information to the terminal device, where the first indication information is used by the terminal device to determine the first interlace set.

In an embodiment, the first interlace set includes at least one first interlace having a consecutive index, the first indication information includes a first resource indicator value RIV, the first RIV is used to determine a start value and a length of the index of the first interlace included in the first interlace set, where the start value is determined by taking the second frequency domain reference point as a start position, and the length is used to determine a number of the first interlace included in the first interlace set.

In an embodiment, the first RIV has a following relationship with the start value S and the length L of the index of the first interlace:

if $(L-1) \leq \text{floor}(M/2)$, $RIV = M \times (L-1) + S$;

otherwise, $RIV = M \times (M-L+1) + (M-1-S)$;

where floor denotes down rounding, $1 \leq L \leq M-S$, $0 \leq S \leq M-1$, and M denotes a total number of the first interlace.

In an embodiment, the first interlace set includes at least two first interlaces having non-consecutive indexes, and the first indication information includes a second RIV, where the second RIV is used to determine the at least two first interlaces having non-consecutive indexes included in the first interlace set.

In an embodiment, the first indication information includes a first frequency domain offset, the first frequency domain offset is used to determine a frequency domain unit X included in a first interlace with an index of 0, and the frequency domain unit X included in the first interlace with the index of 0 satisfies:

$$\mathrm{Mod}(X,M) = \text{the first frequency domain offset};$$

where Mod denotes a modulo operation, X denotes an index of a frequency domain unit included in the first interlace with the index of 0 when the second frequency domain reference point is taken as a start position, and a value of X ranges from 0 to N−1, M denotes a total number of the first interlace, N denotes a total number of frequency domain units included between the second frequency domain reference point and the third frequency domain reference point, and M and N are positive integers.

In an embodiment, the first indication information further includes indication information of the index of the first interlace included in the first interlace set.

In an embodiment, the first indication information includes a second frequency domain offset, the second frequency domain offset is used to determine a frequency domain unit Y included in the first interlace set, and the frequency domain unit Y included in the first interlace set satisfies:

$$\mathrm{Mod}(Y,M) = \text{the second frequency domain offset};$$

where Mod denotes a modulo operation, Y denotes an index of a frequency domain unit included in the first interlace set when the second frequency domain reference point is taken as a start position, a value of Y ranges from 0 to N−1, M denotes a number of the first interlace, N denotes a total number of frequency domain units included between the second frequency domain reference point and the third frequency domain reference point, and M and N are positive integers.

In an embodiment, the first frequency domain reference point and the second frequency domain reference point have a third frequency domain offset therebetween, where the third frequency domain offset is preset, or is indicated by a network device to the terminal device.

In an embodiment, the first frequency domain reference point and the second frequency domain reference point have a third frequency domain offset therebetween, where the third frequency domain offset is determined according to a first subcarrier spacing SCS, and the first SCS is an SCS corresponding to the first interlace set; or, the third frequency domain offset is determined according to a second SCS, the second SCS is an SCS corresponding to the first carrier.

In an embodiment, the first frequency domain reference point and the third frequency domain reference point have a fourth frequency domain offset therebetween, where the fourth frequency domain offset is preset, or is indicated by a network device to the terminal device.

In an embodiment, the first frequency domain reference point and the third frequency domain reference point have a fourth frequency domain offset therebetween, where the fourth frequency domain offset is determined according to a first subcarrier spacing SCS, and the first SCS is an SCS corresponding to the first interlace set; or, the fourth frequency domain offset is determined according to a second SCS, and the second SCS is an SCS corresponding to the first carrier.

In an embodiment, the communicating module is further configured to: indicate second indication information to the terminal device, where the second indication information is used by the terminal device to determine the first interlace set.

In an embodiment, the second indication information includes at least one of a fifth frequency domain offset and a sixth frequency domain offset, the fifth frequency domain offset is used to determine a frequency domain unit P included in a first interlace with an index of 0, and the frequency domain unit P included in the first interlace with the index of 0 satisfies:

$$\mathrm{Mod}(P - \text{the sixth frequency domain offset}, M) = \text{the fifth frequency domain offset},$$

where Mod denotes a modulo operation, P denotes an index of a frequency domain unit included in the first interlace with the index of 0 when the first frequency domain reference point is taken as a start position, a value of P ranges from the sixth frequency domain offset to the sixth frequency domain offset+N−1, M denotes a total number of the first interlace, N denotes a total number of frequency domain units included between the second frequency domain reference point and the third frequency domain reference point, and M and N are positive integers.

In an embodiment, the second indication information further includes indication information of the index of the first interlace included in the first interlace set.

In an embodiment, the second indication information includes at least one of a seventh frequency domain offset and an eighth frequency domain offset, the seventh frequency domain offset is used to determine a frequency domain unit Q included in the first interlace set, and the frequency domain unit Q included in the first interlace set satisfies:

$$\mathrm{Mod}(Q - \text{the eighth frequency domain offset}, M) = \text{the seventh frequency domain offset},$$

where Mod denotes a modulo operation, Q denotes an index of a frequency domain unit included in the first interlace set when the first frequency domain reference point is taken as a start position, a value of Q ranges from the eighth frequency domain offset to the eighth frequency domain offset+N−1, M denotes a number of the first interlace, N denotes a total number of frequency domain units included between the second frequency domain reference point and the third frequency domain reference point, and M and N are positive integers.

In an embodiment, the second frequency domain reference point is a first subcarrier included in a first frequency domain unit of the first carrier; and/or, the third frequency domain reference point is a last subcarrier included in a last frequency domain unit of the first carrier.

In an embodiment, the first frequency domain reference point is a common reference point for carrier configuration.

In an embodiment, a total number of the first interlace is determined according to an SCS corresponding to the first interlace, where the total number of the first interlace M=10 when the SCS corresponding to the first interlace is 15 kHz; or the total number of the first interlace M=5 when the SCS corresponding to the first interlace is 30 kHz.

In an embodiment, the first interlace set is a first bandwidth part BWP on the first carrier configured by a network device for the terminal device.

In an embodiment, the first interlace set is an uplink resource on the first carrier allocated by a network device for the terminal device.

It should be understood that the network device 500 according to the embodiments of the present application can correspond to the network device in the method embodiments of the present application, and the above-mentioned and other operations and/or functions of each unit in the network device 500 are for implementing the corresponding process of the network device in the method 300 shown in FIG. 3, which will not be repeated here for brevity.

Figure 10:
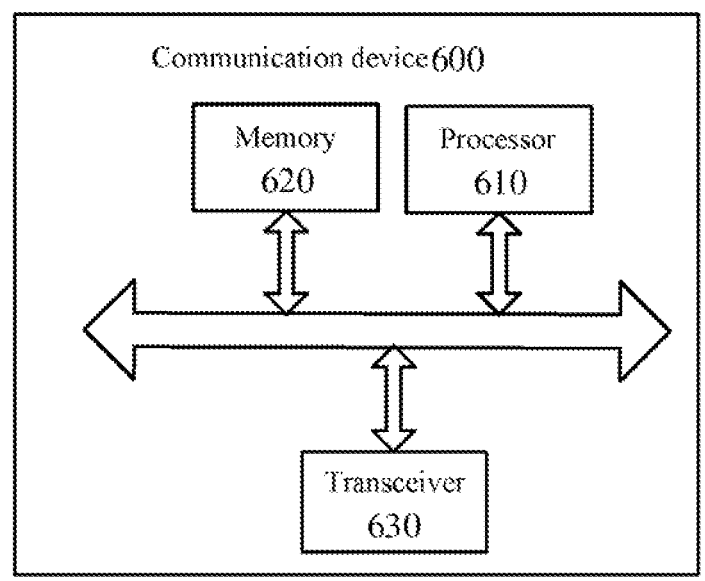
FIG. 10 is a schematic block diagram of a communication device provided in another embodiment of the present application.

FIG. 10 shows a schematic structural diagram of a communication device 600 according to an embodiment of the present application. The communication device 600 shown in FIG. 10 includes a processor 610, and the processor 610 can call and run a computer program in a memory, to implement the method in the embodiments of the present application.

In an embodiment, as shown in FIG. 6, the communication device 600 may further include a memory 620, where the processor 610 can call and run a computer program from the memory 620 to implement the method in the embodiments of the present application.

The memory 620 may be a separate device independent of the processor 610 or may be integrated in the processor 610.

In an embodiment, as shown in FIG. 10, the communication device 600 may further include a transceiver 630, and the processor 610 can control the transceiver 630 to communicate with other devices, and specifically, can transmit information or data to other devices, or receive information or data transmitted by other devices.

The transceiver 630 may include a transmitter and a receiver. The transceiver 630 may further include an antenna, and the number of antennas can be one or more.

In an embodiment, the communication device 600 can specifically be the network device in the embodiments of the present application, and the communication device 600 can implement the corresponding processes implemented by the network device in each method of the embodiments of the present application, which will not be repeated here for brevity.

In an embodiment, the communication device 600 can specifically be the mobile terminal/terminal device in the embodiments of the present application, and the communication device 600 can implement the corresponding processes implemented by the mobile terminal/terminal device in each method of the embodiments of the present application, which will not be repeated here for brevity.

Figure 11:
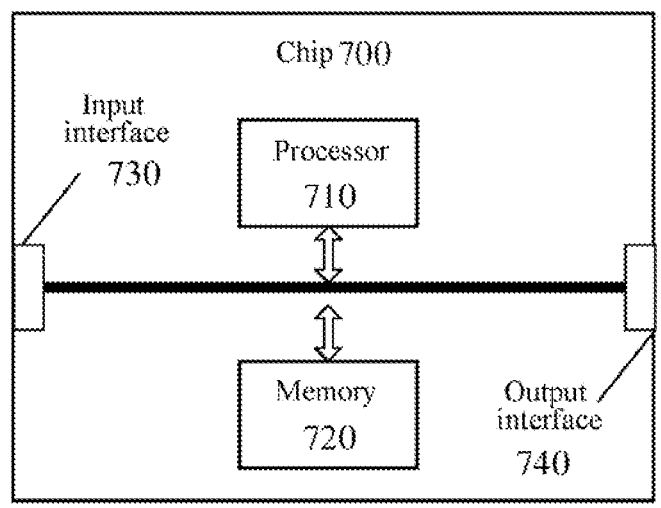
FIG. 11 is a schematic block diagram of a chip provided in an embodiment of the present application.

FIG. 11 shows a schematic structural diagram of a chip according to an embodiment of the present application. The chip 700 shown in FIG. 11 includes a processor 710, which can call and run a computer program from a memory to implement the method in the embodiments of the present application.

In an embodiment, as shown in FIG. 11, the chip 700 may further include a memory 720, where the processor 710 can call and run a computer program from the memory 720 to implement the method in the embodiments of the present application.

The memory 720 may be a separate device independent of the processor 710 or may be integrated in the processor 710.

In an embodiment, the chip 700 may further include an input interface 730, where the processor 710 can control the input interface 730 to communicate with other devices, and specifically, can obtain information or data sent by other devices or chips.

In an embodiment, the chip 700 may further include an output interface 740, where the processor 710 can control the output interface 740 to communicate with other devices, and specifically, can send information or data to other devices or chips.

In an embodiment, the chip can be applied to the network device in the embodiments of the present application, and the chip can implement the corresponding processes implemented by the network device in each method of the embodiments of the present application, which will not be repeated here for brevity.

In an embodiment, the chip can be applied to the mobile terminal/terminal device in the embodiments of the present application, and the chip can implement the corresponding processes implemented by the mobile terminal/terminal device in each method in the embodiments of the present application, which will not be repeated here for brevity.

It should be understood that the chips mentioned in the embodiments of the present application can also be called a system-level chip, a system chip, a chip system or a system-on-chip chip.

Figure 12:
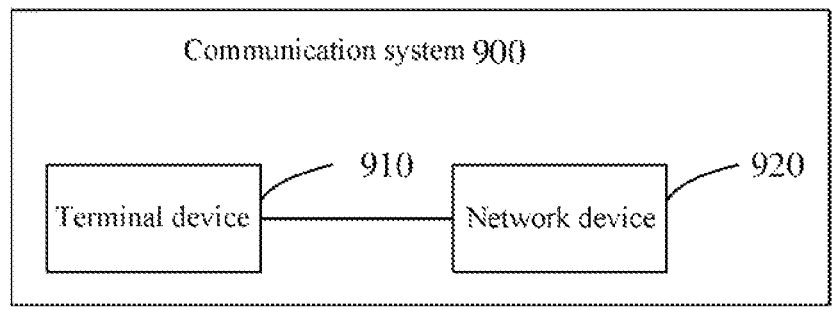
FIG. 12 is a schematic block diagram of a communication system provided in an embodiment of the present application.

FIG. 12 shows a schematic block diagram of a communication system 900 according to an embodiment of the present application. As shown in FIG. 12, the communication system 900 includes a terminal device 910 and a network device 920.

The terminal device 910 can be configured to implement the corresponding functions implemented by the terminal device in the above methods, and the network device 920 can be configured to implement the corresponding functions implemented by the network device in the above methods, which will not be described here for brevity.

It should be understood that the processor of the embodiments of the present application may be an integrated circuit chip with signal processing capability. In an implementation process, each step of the above method embodiments can be completed by an integrated logic circuit of hardware in a processor or instructions in the form of software. The above-mentioned processor can be a general-purpose processor, a digital signal processor (DSP), an application specific integrated circuit (ASIC), a field programmable gate array (FPGA) or other programmable logic devices, discrete gates or transistor logic devices, discrete hardware components. The methods, steps and logic block diagrams disclosed in the embodiments of the present application can be implemented or performed. The general processor can be a micro-processor or any regular processor. The steps of the method disclosed in connection with the embodiments of the present application can be directly embodied as being executed and completed by a hardware decoding processor, or by a combination of hardware and software modules in the decoding processor. The software module can be located in a mature storage medium in the art, such as a random access memory, a flash memory, a read-only memory, a programmable read-only memory or an electrically-erasable programmable memory and a register. The storage medium is located in the memory, and the processor reads information in the memory and completes the steps in the above method in combination with its hardware.

It can be understood that the memory in the embodiments of the present application may be a volatile memory or a non-volatile memory, or both of them. The nonvolatile memory may be a read-only memory (ROM), programmable ROM (PROM), an erasable PROM (EPROM), an electrically EPROM (EEPROM) or a flash memory. The volatile memory may be a random access memory (RAM), which is used as an external cache. By way of example but not limitation, many forms of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink synchronous dynamic random access memory (SLDRAM) and a direct rambus random access memory (DR RAM). It should be noted that the memories of the systems and methods described herein is intended to include, but is not limited to, these and any other suitable types of memory.

It should be understood that the memories mentioned above are illustrated by way of example but not limitation, and for example, the memories in the embodiments may also be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), a direct rambus random access memory (DR RAM) and so on. That is, the memory of the embodiments of the present application is intended to include, but is not limited to, these and any other suitable types of memory.

The embodiments of the present application also provided a computer-readable storage medium for storing a computer program.

In an embodiment, the computer-readable storage medium can be applied to the network device in the embodiments of the present application, and the computer program enables a computer to perform the corresponding processes implemented by the network device in each method of the embodiments of the present application, which will not be repeated here for brevity.

In an embodiment, the computer-readable storage medium can be applied to the mobile terminal/terminal device in the embodiments of the present application, and the computer program enables a computer to perform the corresponding processes implemented by the mobile terminal/terminal device in each method in the embodiments of the present application, and for brevity, which will not be repeated here for brevity.

An embodiment of the present application also provides a computer program product including computer program instructions.

In an embodiment, the computer program product can be applied to the network device in the embodiments of the present application, and the computer program instructions enable a computer to perform the corresponding processes implemented by the network device in each method of the embodiments of the present application, which will not be repeated here for brevity.

In an embodiment, the computer program product can be applied to the mobile terminal/terminal device in the embodiments of the present application, and the computer program instructions enable a computer to perform the corresponding processes implemented by the mobile terminal/terminal device in each method in the embodiments of the present application, which will not be repeated here for brevity.

An embodiment of the present application also provides a computer program.

In an embodiment, the computer program can be applied to the network device in the embodiments of the present application, and the computer program, when running on a computer, enables the computer to perform the corresponding processes implemented by the network device in each method of the embodiments of the present application, which will not be repeated here for brevity.

In an embodiment, the computer program can be applied to the mobile terminal/terminal device in the embodiments of the present application, and the computer program, when running on a computer, enables the computer to perform the corresponding processes implemented by the mobile terminal/terminal device in each method in the embodiments of the present application, which will not be repeated here for brevity.

Those of ordinary skill in the art can realize that the units and algorithm steps of respective examples described in connection with the embodiments disclosed herein can be implemented by electronic hardware, or a combination of computer software and electronic hardware. Whether these functions are implemented by hardware or software depends on the specific application and design constraints of the technical solution. Those skilled in the art can use different methods to implement the described functions for each specific application, but such implementation should not be considered beyond the scope of the present application.

Those skilled in the art could clearly understand that, for the convenience and brevity of description, reference can be made the corresponding processes in the aforementioned methods embodiments for the specific working processes of the above-described systems, apparatuses and units, which will not be described in detail here.

In several embodiments provided in the present application, it should be understood, the systems, devices and methods disclosed can be implemented by other means. For example, the apparatus embodiments described above are only illustrative, for example the division of the units is only a logical function division, and there may be another division manner in actual implementation, for example, multiple units or components may be combined or integrated into another system, or some features may be ignored or not executed. On the other hand, the coupling or direct coupling or communication connection shown or discussed may be indirect coupling or communication connection through some interfaces, devices or units, which may be in electrical, mechanical or other forms.

The units described as separation components may or may not be physically separated, and the components described as units may or may not be physical units, that is, they may be located in one place or distributed to multiple network units. Some or all of the units can be selected according to actual needs to achieve the purpose of the solution of the present application.

In addition, various functional units in respective embodiments of the present application may be integrated into one processing unit, or each unit may physically exist separately, or two or more units may be integrated into one unit.

If the function is implemented in the form of software functional unit and sold or used as an independent product, it can be stored in a computer readable storage medium. Based on this understanding, the technical solution of the present application in essence, or part of the solution contributing to the prior art or part of the solution may be embodied in the form of a software product, which is stored in a storage medium and includes several instructions to cause a computer device (which may be a personal computer, a server, or a network device, etc.) to perform all or part of the steps of the method described in the embodiments of the present application. The aforementioned storage medium includes: a U disk, a mobile hard disk, a read-only memory (ROM), a random access memory (RAM), a magnetic disk or an optical disk, etc., which can store program codes.

The above is only the embodiments of the present application, but the protection scope of the present application is not limited thereto. Any person familiar with the technical field can easily think of changes or substitutions within the technical scope disclosed by the present application, which should be covered within the protection scope of the present application. Therefore, the protection scope of the present application shall be subject to the protection scope of the claims.

What is claimed is:

1. A wireless communication method, comprising:
   determining, by a terminal device, a first interlace set on a first carrier according to a first frequency domain reference point, wherein the first interlace set includes at least one first interlace, the first interlace includes at least two frequency domain units, any two adjacent frequency domain units of the at least two frequency domain units are non-consecutive, and a frequency domain spacing between any two adjacent frequency domain units of the at least two frequency domain units is equal; and
   performing, by the terminal device, uplink transmission through frequency domain units comprised in the first interlace set;
   wherein the determining, by a terminal device, a first interlace set on a first carrier according to a first frequency domain reference point, comprises:
   determining, by the terminal device, a second frequency domain reference Dona and/or a third frequency domain reference point according to the first frequency domain reference point; and
   determining, by the terminal device, the first interlace set according to the second frequency domain reference point and/or the third frequency domain reference point.

2. The method according to claim 1, wherein the determining the first interlace set according to the second frequency domain reference point and: or the third frequency domain reference point, comprises:
   determining, by the terminal device, the first interlace set according to the second frequency domain reference point and/or the third frequency domain reference point, and first indication information.

3. The method according to claim 2, wherein the first interlace set comprises at least one first interlace having a consecutive index, the first indication information comprises a first resource indicator value (RIV), the first RIV is used to determine a start value and a length of the index of the first interlace comprised in the first interlace set, wherein the start value is determined by taking the second frequency domain reference point as a start position, and the length is used to determine a number of the first interlace comprised in the first interlace set.

4. The method according to claim 2, wherein the first RIV has a following relationship with the start value S and the length L of the index of the first interlace:
   if $(L-1) \leq \text{floor}(M/2)$, $RIV = M \times (L-1) + S$;
   otherwise, $RIV = M \times (M-L+1) + (M-1-S)$;
   wherein floor denotes down rounding, $1 \leq L \leq M-S$, $0 < S < M-1$, and M denotes a total number of the first interlace.

5. The method according to claim 2, wherein the first interlace set comprises at least two first interlace having non-consecutive indexes, the first indication information comprises a second REV, and the second RIV is used to determine the at least two first interlace having non-consecutive indexes comprised in the fiat interlace set.

6. The method according, to claim 2, wherein the first indication information comprises a first frequency domain offset, the first frequency domain offset is used to determine a frequency domain unit X comprised in a first interlace with an index of 0, and the frequency domain unit X comprised in the first interlace with the index of 0 satisfies:
   Mod (X, M)=the first frequency domain offset:
   wherein Mod denotes a modulo operation, X denotes an index of a frequency domain unit comprised in the first interlace with the index of 0 when the second frequency domain reference point is taken as a start position, and a value of X ranges from 0 to N-1, M denotes a total number of the first interlace, N denotes a total number of frequency domain units comprised between the second frequency domain reference point and the third frequency domain reference point, and M and N are positive integers.

7. The method according to claim 6, wherein the first indication information further comprises indication information of the index of the first interlace comprised in the first interlace set.

8. The method according to claim 2, wherein the first indication information includes a second frequency domain offset, the second frequency domain offset is used to determine a frequency domain unit Y comprised in the first interlace set, and the frequency domain unit Y comprised in the first interlace set satisfies:
   Mod(Y, M)=the second frequency domain offset;
   Wherein Mod denotes a modulo operation, Y denotes an index of a frequency domain unit comprised in the first interlace set when the second frequency domain reference point is taken as a start position, a value of Y ranges from 0 to N-1, M denotes a number of the first interlace, N denotes a total number of frequency domain units comprised between the second frequency domain reference point and the third frequency domain reference point, and M and N are positive integers.

9. The method according to claim 1, wherein the first frequency domain reference point and the second frequency domain reference point have a third frequency domain offset therebetween, wherein the third frequency domain offset is preset or is indicated to the terminal device by a network device.

10. The method according, to claim 1, wherein the first frequency domain reference point and the second frequency domain reference point have a third frequency domain offset therebetween,
    wherein the third frequency domain offset is determined according to a first subcarrier spacing (SCS), and the first SCS is an SCS corresponding to the first interlace set; or,
    the third frequency domain offset is determined according to a second SCS, and the second SCS is an SCS corresponding to the first carrier.

11. A non-transitory computer readable storage medium, configured to store a computer program, the computer program causing a computer to perform the method according to claim 1.

12. A wireless communication method, comprising:
    indicating, by a network device, a first frequency domain reference point to a terminal device, the first frequency domain reference point being used by the terminal device to determine a first interlace set on a first carrier, wherein the first interlace set comprises at least one first interlace, the first interlace comprises at least two frequency domain units, any two adjacent frequency domain units of the at least two frequency domain units are non-consecutive, and a frequency domain spacing between any two adjacent frequency domain units of the at least two frequency domain units is equal wherein the first frequency domain reference point is further used 1w the terminal domain reference point so as to determine the first interlace set according to the second frequency domain reference point and: or the third frequency domain reference point.

13. The method according to claim 12, wherein the first frequency domain reference point is a common reference point used for carrier configuration.

14. A terminal device, comprising:
a memory, a processor, a transceiver and a computer program stored on the memory and operable on the processor,
wherein the processor, when running the computer program, is configured to:
determine, according to a first frequency domain reference point, a first interlace set on a first carrier, wherein the first interlace set comprises at least one first interlace, the first interlace comprises at least two frequency domain units, any two adjacent frequency domain units of the at least two frequency domain units are non-consecutive, and a frequency domain spacing between any two adjacent frequency domain units of the at least two frequency domain units is equal; and control the transceiver to perform uplink transmission through frequency domain units comprised in the first interface set:
wherein the processor when running the computer program is further configured to:
determine a second frequency domain reference point and/or a third frequency domain reference point according to the first frequency domain reference point; and
determine the first interlace set according to the second frequency domain reference point and/or the third frequency domain reference point.

* * * * *